US010040174B2

(12) United States Patent
Yang et al.

(10) Patent No.: US 10,040,174 B2
(45) Date of Patent: Aug. 7, 2018

(54) CLAMPING JIG

(71) Applicants: SHENZHENSHI YUZHAN PRECISION TECHNOLOGY CO., LTD., Shenzhen (CN); CLOUD NETWORK TECHNOLOGY SINGAPORE PTE. LTD., Singapore (SG)

(72) Inventors: Bo Yang, Shenzhen (CN); Yong Xie, Shenzhen (CN)

(73) Assignees: SHENZHENSHI YUZHAN PRECISION TECHNOLOGY, Shenzhen (CN); Cloud Network Technology Singapore Pte. Ltd., Singapore (SG)

( * ) Notice: Subject to any disclaimer, the term of this patent is extended or adjusted under 35 U.S.C. 154(b) by 365 days.

(21) Appl. No.: 14/793,142

(22) Filed: Jul. 7, 2015

(65) Prior Publication Data

US 2016/0129560 A1 May 12, 2016

(30) Foreign Application Priority Data

Nov. 11, 2014 (CN) .......................... 2014 1 0630145

(51) Int. Cl.
*B23Q 3/00* (2006.01)
*B25B 5/06* (2006.01)
(Continued)

(52) U.S. Cl.
CPC .............. *B25B 5/065* (2013.01); *B25B 5/006* (2013.01); *B25B 5/02* (2013.01); *B25B 5/06* (2013.01)

(58) Field of Classification Search
USPC ............... 269/269, 20, 289 R, 291, 309, 310
See application file for complete search history.

(56) References Cited

U.S. PATENT DOCUMENTS 4,222,577 A * 9/1980 Giffin ................ B23B 31/16004 269/156
5,378,970 A * 1/1995 Sato ...................... G01R 31/01 269/233
(Continued)

FOREIGN PATENT DOCUMENTS

CN 101468447 A 7/2009
CN 103496496 A 1/2014
(Continued)

*Primary Examiner* — Joseph J Hail
*Assistant Examiner* — Shantese McDonald
(74) *Attorney, Agent, or Firm* — ScienBiziP, P.C.

(57) ABSTRACT

A clamping jig for fixing a workpiece in position includes a base, a cover mounted on the base, a driving assembly and a clamping assembly. The cover has a top face for receiving the workpiece thereon. The driving assembly includes a diaphragm type pneumatic actuator fixed to the base and a linkage slideably received in the base for receiving a pushing force from the diaphragm type pneumatic actuator. The clamping assembly includes a plurality of clamping members each including a wedge slideably received in the base and an abutment extending upwardly from the wedge through the cover. Under action of the linkage to the wedges, the abutments are movable between a first position to engage with the workpiece to a second position to release their engagements from the workpiece.

19 Claims, 4 Drawing Sheets

(51) Int. Cl.

| | |
|---|---|
| ***B25B 5/00*** | (2006.01) |
| ***B25B 5/02*** | (2006.01) |

(56) References Cited

U.S. PATENT DOCUMENTS

| | | | | |
|---|---|---|---|---|
| 9,111,975 | B2 * | 8/2015 | Li | H01L 21/67706 |
| 2009/0048007 | A1 * | 2/2009 | Bury | B60R 11/0241 455/575.9 |

FOREIGN PATENT DOCUMENTS

| | | | |
|---|---|---|---|
| CN | 203792066 | U | 8/2014 |
| TW | 201325853 | A | 7/2013 |
| TW | 201407047 | A | 2/2014 |

* cited by examiner

CLAMPING JIG

CROSS-REFERENCE TO RELATED APPLICATIONS

This application claims priority to Chinese Patent Application No. 201410630145.X filed on Nov. 11, 2014, the contents of which are incorporated by reference herein.

FIELD

The subject matter herein generally relates to a clamping jig, and particularly to a clamping jig for fixing a workpiece in position whereby a processing to the workpiece such as glue application can be easily and precisely performed to the workpiece at desired locations.

BACKGROUND

To facilitate an automatic processing of a workpiece, a clamping jig which can hold the workpiece in position is required. The clamping jig usually includes piston-type pneumatic cylinders which can push a plurality of clamping members to engage with corresponding sides of the workpiece. The conventional clamping jig generally occupies a large space and has a relatively high cost.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
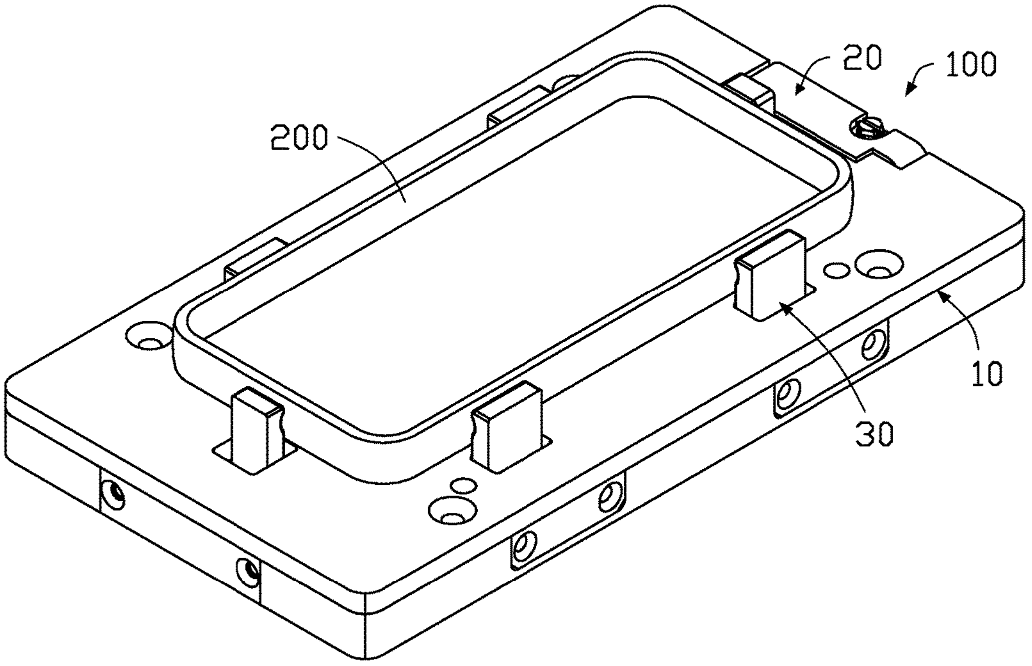
FIG. 1 is a perspective view of a clamping jig in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Referring to FIG. 1, an embodiment of the present disclosure is described in relation to a clamping jig 100 for fixing a workpiece 200 in position whereby a processing to the workpiece 200 such as application of glue thereto can be easily and accurately performed by a robot (not shown). The clamping jig 100 includes a mounting seat 10, a driving assembly 20 and a clamping assembly 30. The driving assembly 20 and the clamping assembly 30 are mounted in the mounting seat 10, wherein the driving assembly 20 can drive the clamping assembly 30 to release its clamping from the workpiece 200, or to clamp the workpiece 200 in position. The workpiece 200 and the mounting seat 100 may each have a substantially rectangular shape.

Figure 3:
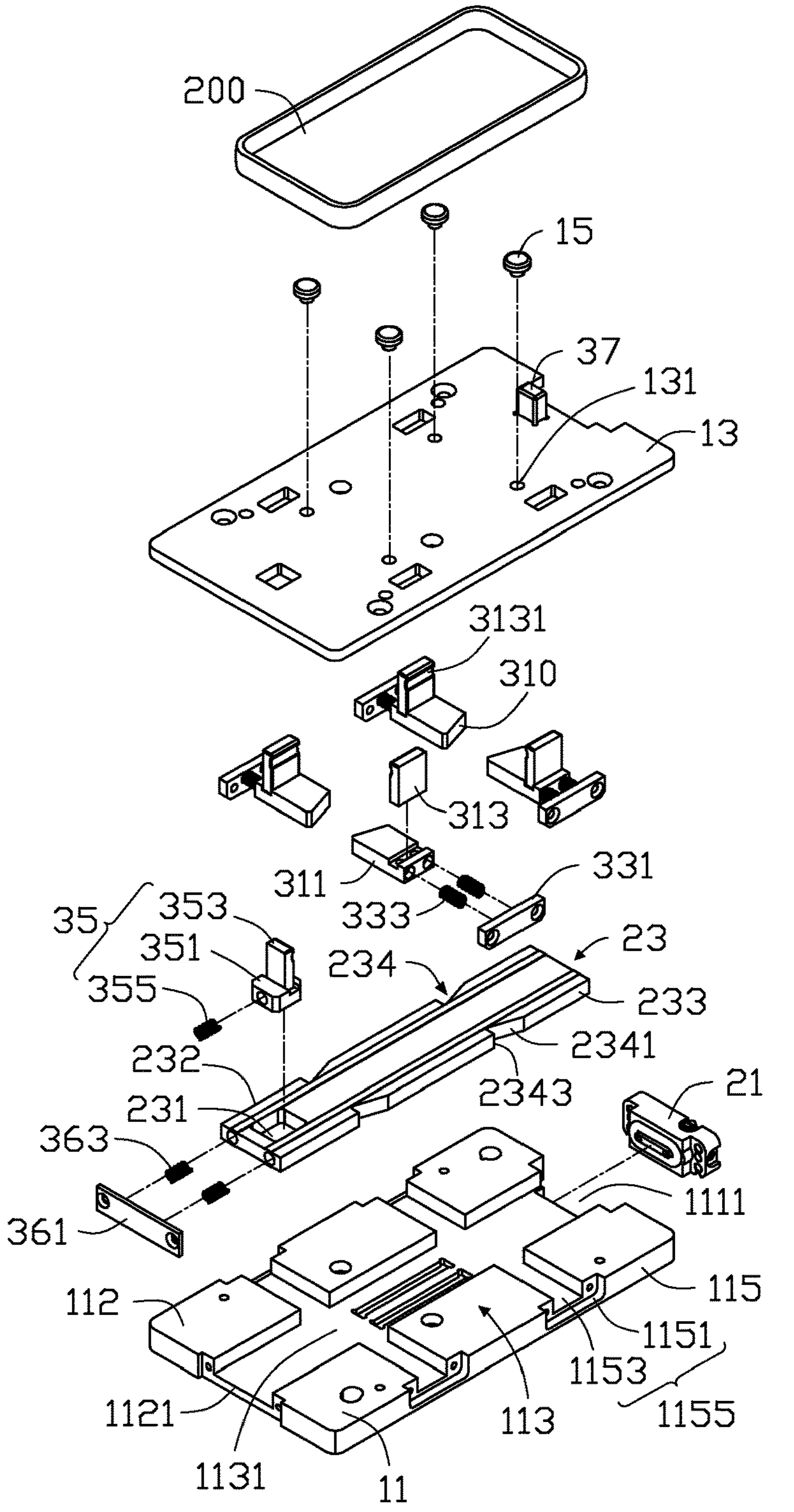
FIG. 3 is a further exploded view of the clamping jig of FIG. 2.
Figure 4:
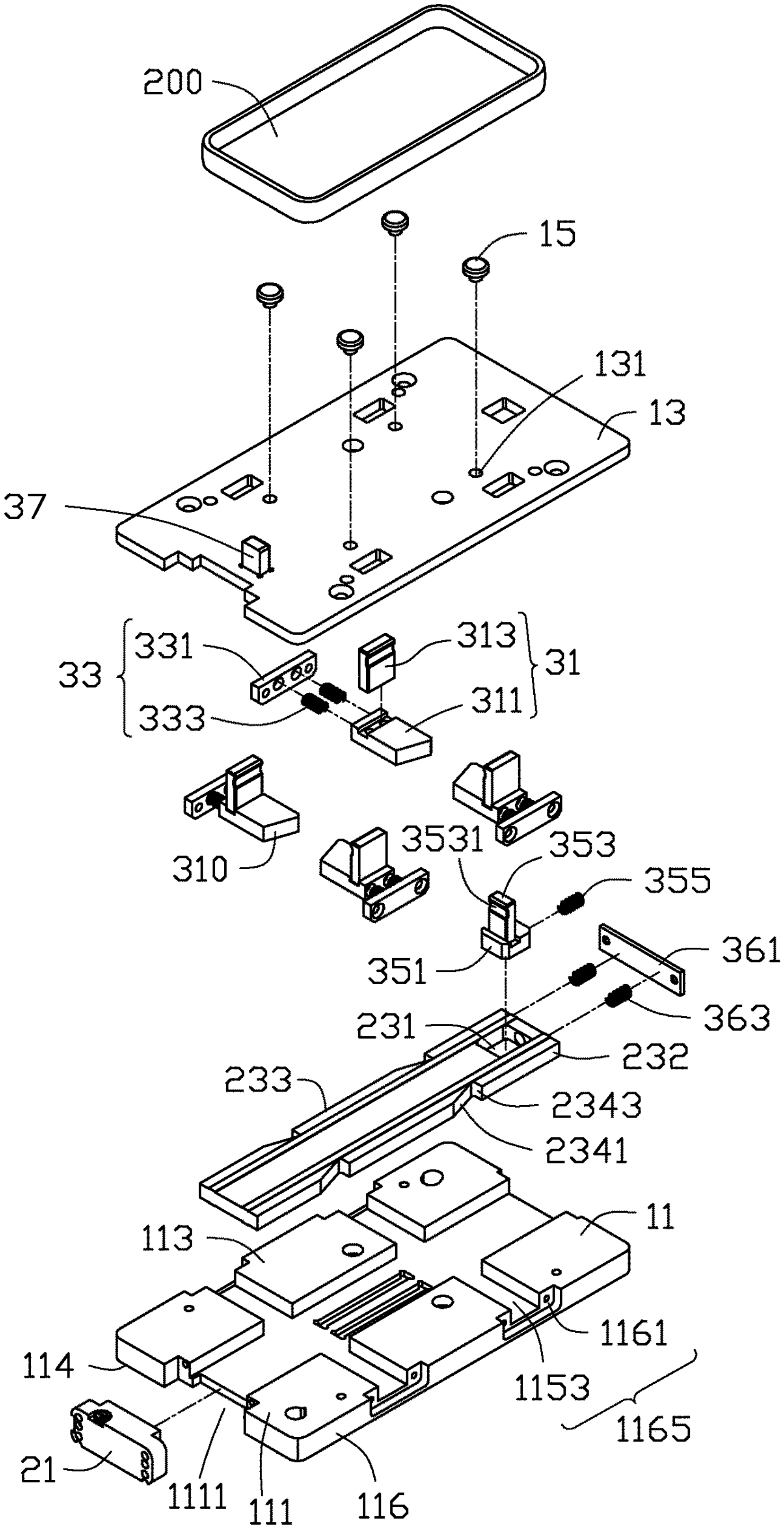
FIG. 4 is a view similar to FIG. 3, but viewed from another angle.

Referring to FIGS. 3-4, the mounting seat 10 generally has a base 11, a cover 13 and a plurality of supports 15. The base 11 has opposite first and second ends 111, 112. The first end 111 is recessed toward the second end 112 to define a mounting recess 1111. The second end 112 is recessed toward the first end 111 to define a fixing recess 1121. The base 11 further defines an upper face 113 and a bottom face 114. A middle of the upper face 113 is recessed downwardly along a longitudinal direction thereof to define a sliding recess 1131. The sliding recess 1131 communicates with the mounting recess 1111 and the fixing recess 1121. In addition, the base 11 defines two opposite first and second lateral sides 115, 116, which are perpendicular to the upper and bottom faces 113, 114. The first lateral side 115 is recessed toward to the second lateral side 116 to define two first fixing portions 1151. Two lateral recesses 1153 which are perpendicular to and communicate with the sliding recess 1131 are defined in the upper face 113 of the base 11. An end of each of the lateral recesses 1153 which is adjacent to a corresponding first fixing portion 1151 cooperates therewith to define a first accommodating recess 1155. The second lateral side 116 is recessed toward the first lateral side 115 to define two second fixing portions 1161. An end of each of the lateral recesses 1153 which is adjacent to a corresponding second fixing portion 1161 cooperates therewith to define a second accommodating recess 1165.

The cover 13 is fixed on the base 11. A plurality of mounting holes 131 is defined in a top face of the cover 13. The supports 15 each have a lower part fixed into a corresponding hole 131, and an upper rounded part for supporting the workpiece 200 thereon. In the shown embodiment, the supports 15 has a number of four. It can be understood that other number is also workable.

The driving assembly 20 includes a driving source 21 and a linkage 23. The driving source 21 is mounted in the mounting recess 1111 for generating a pushing force to the linkage 23. In at least one embodiment, the driving source 21 is a diaphragm type pneumatic actuator. The linkage 23 is a substantially elongated plate which is slideably received in the sliding recess 1131. An end of the linkage 23 distant from the driving source 21 defines an accommodating hole 231. The linkage 23 has opposite first and second lateral sides 232, 233. Each of the first and second lateral sides 232, 233 is recessed to form two resting portions 234 each consisting of a first slanting face 2341 and a resting face 2343. The first slanting faces 2341 defined in the first lateral side 232 are parallel to each other. The first slanting faces 2341 defined in the second lateral side 233 are parallel to each other. The two resting portions 234 near the driving source 21 are mirror image to each other in respect to a longitudinal center line (not shown) of the linkage 23, wherein the resting faces 2343 of the two resting portions 234 are perpendicular to the longitudinal center line while extensions of the slanting faces 2341 thereof intersect each other at the longitudinal center line; as described below, the slanting faces 2341 are cams that move portions of the clamping assembly 30. The two resting portions 234 away from the driving source 21 have a similar geometrical relationship as that of the two resting portions 234 near the driving source 21. The slanting faces 2341 are inclined inwardly along a direction away from the driving source 21.

Figure 2:
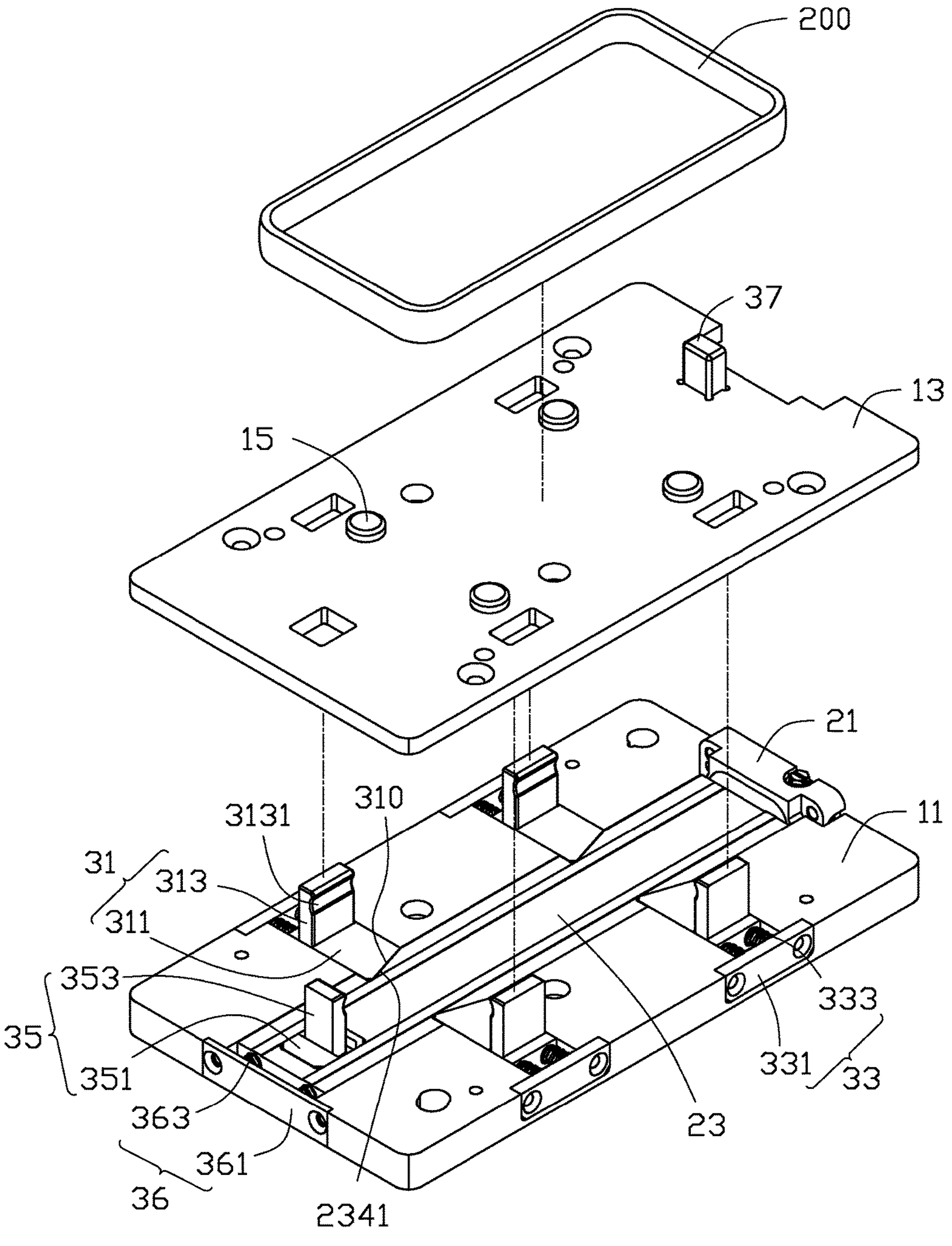
FIG. 2 is an exploded view of the clamping jig of FIG. 1.

Also referring to FIG. 2, the clamping assembly 30 is mounted in the base 11. The clamping assembly 30 includes four first clamping members 31, four first returning members 33, a second clamping member 35, a second returning member 36 and a third clamping member 37. Two of the first clamping members 31 are slideably received in the lateral recess 1153 and located beside the linkage 23. The other two first clamping members 31 are slideably received in the other lateral recess 1153 and located beside the linkage 23. The first clamping members 31 each form a second slanting face 310 slideably engaging with the first slanting face 2341 of a corresponding resting portion 234 of the linkage 23. Each first clamping member 31 has a wedge 311 slideably received in the lateral recess 1153 and defining the second slanting face 310 on an edge thereof near the linkage 23, and an abutment 313 extending upwardly from an end of the wedge 311 distant from the second slanting face 310. The abutments 313 extend upwardly through and beyond the top face of the cover 13 and are movable relative to the cover 13. A groove 3131 is defined in each abutment 313 at a position away from the wedge 311 and facing the linkage 23. The grooves 3131 are provided for facilitating the engagement between the first abutments 313 and the workpiece 200. Understandably, the grooves 3131 can be omitted in an alternative embodiment.

Two first returning members 33 are mounted in the two first accommodating recesses 1155, respectively. Another two first returning members 33 are mounted in the two second accommodating recesses 1165, respectively. Each first returning member 33 includes a first mounting plate 331 and two first resilient members 333 attached to the first mounting plate 331. The first mounting plate 331 is securely received in a corresponding fixing portion 1151 (1161). The two first resilient members 333 are sandwiched between the mounting plate 331 and the wedge 311 of each of the first clamping members 31. Each of the first resilient members 333 is a helical spring.

The second clamping member 35 is mounted in the accommodating hole 231 and slideable therein. The second clamping member 35 includes a fixing part 351, a second abutment 353 integrally extending upwardly from the fixing part 351 through the cover 13 to a position above the top face of the cover 13, and a second resilient member 355. Like the grooves 3131 in the first abutments 313, the second abutment 353 also defines a groove 3531 in a face thereof facing the driving source 21. The fixing part 351 is slideably received in the accommodating hole 231 and movable along a longitudinal direction of the linkage 23. The second resilient member 355 which is a helical spring has one end coupled to a side of the linkage 23 defining the accommodating hole 231 and distant from the driving source 21 and another end coupled to the fixing part 351. In another embodiment, the second resilient member 355, the fixing part 351 and the accommodating hole 231 can be omitted, with only the second abutment 353 formed on the linkage 23.

A second returning member 36 is mounted in the fixing recess 1121. The second returning member 36 includes a second mounting plate 361 secured in the fixing recess 1121, and two third resilient members 363 each having one end coupling with the second mounting plate 361 and an opposite end coupling with the end of the linkage 23 away from the driving source 21. The third clamping member 37 is in a form of a third abutment 37 fixed to the top face of the cover 14, extending upwardly away from the base 11. The third abutment 37 is in a shape of a simple rectangular block, and is in line with the second abutment 353 of the second clamping member 35 along the longitudinal center line of the linkage 23 which is coincidental with longitudinal center lines of the base 11 and the cover 13.

In use of the clamping jig 100, first pressured air is introduced into the driving source 21 and the driving source 21 functions to exert a pushing force on the linkage 23 to cause the linkage 23 to move away from the driving source 21. By the movement of the linkage 23, the first abutments 313 are pushed sideways away from the linkage 23 by a cam action of the first slanting faces 2341 of the linkage 23 on the second slanting faces 310 of the wedges 311. The second abutment 353 is pushed by linkage 23 to move away from the driving source 21 by an action of the linkage 23 on the fixing part 351. Accordingly a space surrounded by the first abutments 313, the second abutment 353 and the third abutment 37 is enlarged to facilitate an accommodation of the workpiece 200 in the space. When the first abutments 313 are pushed sideways and the second abutment 353 is pushed away from the driving source 21, the first resilient members 333, the second resilient member 355 and the third resilient members 363 are compressed.

After the workpiece 200 is put in the space to be supported by the supports 15 which are surrounded by the first, second and third abutments 313, 353, 37, pressured air in the diaphragm type pneumatic actuator 21 is released whereby the pushing force acting on the linkage 23 from the diaphragm type pneumatic actuator 21 is ceased. Then, by expansions of the compressed second and third resilient members 355, 363, the linkage 23 is pushed by the second and third resilient members 355, 363 to move toward the driving source 21; the first abutments 313 are pushed by the expanded first resilient members 333 to move toward the linkage 23 to engage with lateral sides of the workpiece 200; the second abutment 353 is pushed by the expanded second and third resilient members 355, 363 to move toward the driving source 21 to engage with a front end of the workpiece 200. A rear end of the workpiece 200 is engaged by the third abutment 37. Thus, the workpiece 200 can be securely clamped in position by the first, second and third abutments 313, 353, 37. When the workpiece 200 is securely clamped by the first abutments 313, the wedges 311 of the first clamping members 31 engage with the resting faces 2343 of the resting portions 234.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. A clamping jig for fixing a workpiece in position, comprising:
   a base;
   a cover mounted on the base and configured for receiving the workpiece thereon;
   a driving assembly comprising a driving source for generating a driving force and a linkage slideably mounted in the base; and
   a clamping assembly mounted to the base and comprising a plurality of clamping members being set beside lateral sides of the linkage, each clamping member comprising a wedge defining a first slanting face, a mounting plate secured to the base, a resilient member sandwiched between the wedge and the mounting plate, and an abutment extending upwardly from the wedge, the linkage defining a plurality of second slanting faces each slideably engaging with a corresponding first slanting face, the abutments being movable between a first position and a second position under an action of the linkage, at the second position, a space surrounded by the abutments being smaller than a space surrounded by the abutments when the abutments are at the first position, the abutments being configured to engage with the workpiece when the abutments are located at the second position;
      wherein when the linkage is pushed by the driving source to move away therefrom, the abutments are moved to the first position and the resilient members are compressed by an action of the second slanting faces on the first slanting faces.

2. The clamping jig of claim 1, wherein the driving source is a pneumatic driving source.

3. The clamping jig of claim 2, wherein the pneumatic driving source is a diaphragm type pneumatic actuator for generating a pushing force to the linkage.

4. The clamping jig of claim 3, further comprising a second clamping member, the linkage defining an accommodating hole in an end thereof distant from the diaphragm type pneumatic actuator, the second clamping comprising a fixing part slideably received in the accommodating hole, a second abutment extending upwardly from the fixing part through the cover and configured for engaging with the workpiece, and a second resilient member sandwiched between the fixing part and a side of the linkage defining the accommodating hole and away from the diaphragm type pneumatic actuator.

5. The clamping jig of claim 4, further comprising a second mounting plate fixed to an end of the base away from the diaphragm type pneumatic actuator and a third resilient member sandwiched between the second mounting plate and the end of the linkage away from the diaphragm type pneumatic actuator.

6. The clamping jig of claim 5, further comprising a third abutment extending upwardly from the cover and configured for engaging with the workpiece.

7. The clamping jig of claim 6, further comprising a plurality of supports on a top of the cover for supporting the workpiece, the supports being surrounded by the abutments, the second abutment and the third abutment.

8. The clamping jig of claim 7, wherein each of the abutments defines a groove in an inner face thereof.

9. The clamping jig of claim 1, wherein the linkage further defines a plurality of resting faces each being in connection with a corresponding second slanting face to form a resting portion which is concaved from a corresponding lateral side of the linkage, at the second position, the wedges engaging with the resting faces.

10. The clamping jig of claim 9, wherein the resting face is perpendicular to a longitudinal central line of the linkage.

11. A clamping jig for fixing a workpiece in position comprising:
   a base defining a first recess along a longitudinal center thereof, and a plurality of second recesses laterally extended and communicating with the first recess;
   a cover mounted on the base, having a top face configured for receiving the workpiece thereon;
   a linkage received in the first recess and movable therealong;
   a plurality of wedges received in the second recesses and engaging with the linkage; and
   a plurality of abutments extending upwardly from the wedges through the cover;

wherein when the linkage is moved from a first position to a second position, the wedges are pushed by the linkage to move laterally and outwardly so that a space surrounded by the abutments is enlarged and when the linkage is moved from the second position to the first position, the wedges together with the abutments move laterally inwardly for engaging with the workpiece to fix the workpiece in position.

12. The clamping jig of claim 11, further comprising a plurality of resilient members which are compressed by the wedges when the linkage moves from the first to the second position.

13. The clamping jig of claim 11, further comprising a diaphragm type pneumatic actuator fixed to the base, the movement of the linkage from the first position to the second position is achieve by a pushing force generated by the diaphragm type pneumatic actuator and acting on the linkage.

14. The clamping jig of claim 13, further comprising a second resilient member which is compressed by an end of the linkage away from the diaphragm type pneumatic actuator when the linkage moves from the first position to the second position.

15. The clamping jig of claim 14, wherein the movement of the linkage from the second position to the first position is achieved by an expansion of the second resilient member.

16. The clamping jig of claim 15 further comprising a fixing part, a second abutment extending upwardly from the fixing part through the cover for engaging with the workpiece, and a third resilient member, wherein the linkage defines an accommodating hole in the end thereof away from the diaphragm type pneumatic actuator, the fixing part is slideably received in the accommodating hole and the third resilient member is sandwiched between the fixing part and a side of the linkage defining the hole, the third resilient member is compressed when the linkage moves from the first position to the second position.

17. The clamping jig of claim 16, further comprising a third abutment extending upwardly from the cover for engaging with the workpiece.

18. The clamping jig of claim 17, further comprising a plurality of supports fixed on the top face of the cover and configured for supporting the workpiece thereon, the supports being surrounded by the abutments, the second abutment and the third abutment.

19. A clamping jig, comprising:

a base;

a driver moveably mounted along a pathway on the base between an extended and a retracted position, the driver include a plurality of cams on sides thereof;

a spring loaded first clamp aligned to move parallel to the pathway; and second and third spring loaded clamps aligned to move perpendicular to the pathway;

wherein when the driver moves from the extended position to the retracted position, spring pressure moves the first, second and third clamps toward clamping positions;

wherein when the driver moves from the retracted position to the extended position, an end of the driver presses against the first clamp and the cams press against the second and third clamps to move them out of the clamping positions.

* * * * *